United States Patent
Kageyama et al.

(10) Patent No.: US 9,217,448 B2
(45) Date of Patent: Dec. 22, 2015

(54) CYLINDER POSITION MEASURING DEVICE AND CYLINDER POSITION MEASURING METHOD

(71) Applicants: Masato Kageyama, Oyama (JP); Yuuki Yokoyama, Oyama (JP)

(72) Inventors: Masato Kageyama, Oyama (JP); Yuuki Yokoyama, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/814,518

(22) PCT Filed: Sep. 26, 2012

(86) PCT No.: PCT/JP2012/074786
§ 371 (c)(1),
(2) Date: Feb. 6, 2013

(87) PCT Pub. No.: WO2014/049751
PCT Pub. Date: Apr. 3, 2014

(65) Prior Publication Data
US 2015/0192152 A1    Jul. 9, 2015

(51) Int. Cl.
| | |
|---|---|
| G01B 7/14 | (2006.01) |
| G01R 35/00 | (2006.01) |
| F15B 15/28 | (2006.01) |
| G01D 5/14 | (2006.01) |
| G01D 18/00 | (2006.01) |

(52) U.S. Cl.
CPC ............ *F15B 15/2861* (2013.01); *G01D 5/145* (2013.01); *G01D 18/00* (2013.01)

(58) Field of Classification Search
CPC ....................................................... G01B 7/14
USPC ...................................................... 324/207.24
See application file for complete search history.

(56) References Cited

U.S. PATENT DOCUMENTS

| | | | |
|---|---|---|---|
| 6,346,806 | B1 | 2/2002 | Schabuble et al. |
| 7,757,547 | B2 | 7/2010 | Kageyama et al. |
| 2009/0139316 | A1 | 6/2009 | Kageyama et al. |

FOREIGN PATENT DOCUMENTS

| | | |
|---|---|---|
| JP | 63-111409 A | 5/1988 |
| JP | 05-126508 A | 5/1993 |
| JP | 5-75603 U | 10/1993 |
| JP | 06-249605 A | 9/1994 |
| JP | 2001-507456 A | 6/2001 |
| JP | 2006-226909 A | 8/2006 |
| JP | 2006-258730 A | 9/2006 |
| JP | 2010-255715 A | 11/2010 |
| KR | 10-2009-0006190 A | 1/2009 |
| WO | WO-98/40699 A1 | 9/1998 |

OTHER PUBLICATIONS

International Seach Report dated Nov. 6, 2012, issued for PCT/JP2012/074786 (in Japanese language).

*Primary Examiner* — Bot Ledynh
(74) *Attorney, Agent, or Firm* — Locke Lord LLP (57) ABSTRACT

An arithmetic processing portion is configured to perform a correction process for resetting an original position of the stroke position by using at least detection results of a voltage value of a first magnetic force sensor as well as a second magnetic force sensor according to the piston movement, and further not to perform the correction process to reset the original position of the stroke position by using the detection result of the first magnetic force sensor and the second magnetic force sensor right after an abutment when the piston is abutted to the stroke end based on a detection result of a stroke end abutment detecting system.

6 Claims, 12 Drawing Sheets

(a) ABUTMENT TO STROKE END

PRESSURIZATION (b) RIGHT AFTER ABUTMENT TO STROKE END

FIG.13 ically moves with a rod inside a cylinder tube of a hydraulic pressure cylinder or the like, and a magnetic force sensor that is disposed outside the cylinder tube. By detecting a magnetic force passing through the magnetic force sensor, this device measures the cylinder piston position.

CYLINDER POSITION MEASURING DEVICE AND CYLINDER POSITION MEASURING METHOD

FIELD

This invention relates to a cylinder position measuring device and a cylinder position measuring method for measuring a position of a linearly moving member that linearly moves inside a cylinder tube.

BACKGROUND

There is a cylinder piston position measuring device provided with a permanent magnet that is disposed on a piston that linearly moves with a rod inside a cylinder tube of a hydraulic pressure cylinder or the like, and a magnetic force sensor that is disposed outside the cylinder tube. By detecting a magnetic force passing through the magnetic force sensor, this device measures the cylinder piston position.

For example, there is a device wherein a rotary encoder for detecting a linearly moving amount of the rod as a rotation amount is disposed on a cylinder head, and a magnetic force sensor for resetting is disposed in the middle of the cylinder tube and on the tube outer circumferential surface of the cylinder tube. This magnetic force sensor for resetting detects the magnetic force generated by a magnet fixed on the piston that linearly moves inside the cylinder tube, and resets a measured position obtained from a detection value of the rotary encoder to an original position when the magnetic force reaches its maximum value.

Here, since a tube of a hydraulic pressure cylinder is constituted with a magnetic material, there is a certain time lag (refer to a transmission lag) when a magnetism generated inside the tube travels through the tube and arrives at the magnetic force sensor outside the tube. On the other hand, a velocity of piston movement inside the cylinder tube is not constant, and thus a stroke position obtained by an arithmetic processing when the magnetic force detected by the magnetic force sensor (refer to a reset sensor) reaches its peak may deviate from an actual stroke position (refer to original position) depending on the velocity of piston movement.

Accordingly, in Patent Literature 1, a correspondence between a passage velocity right under the reset sensor of the piston and the deviation amount of the position from the origin position (refer to a peak position correction amount) is preliminary obtained and memorized in a table format, and the original position is corrected by detecting the passage velocity right under the reset sensor at each time when a stroke is made.

CITATION LIST

Patent Literature

Patent Literature 1: Japanese Laid-open Patent Publication No. 2006-226909

SUMMARY

Technical Problem

In the patent literature 1, although the stroke position can be measured while an influence of the velocity of piston movement is eliminated, there are cases where high pressures, such as 200 to 400 kg/cm$^2$, are applied in the hydraulic pressure cylinder, and this causes a large distortion in a magnetized tube, and further, its surface magnetic force is decreased as well as the peak position of the magnetic force wave pattern detected by the reset sensor is altered, and consequently a degree of accuracy for detection is decreased.

This invention has been made taking the above situation into consideration, an objective thereof is to provide a cylinder position measuring device and a cylinder position measuring method that can measure the stroke position of the cylinder with a high degree of accuracy, even in a situation where a high hydraulic pressure is applied inside the cylinder.

Solution to Problem

According to an aspect of the present invention in order to solve the above-problems and achieve the object, there is provided a cylinder position measuring device for measuring a position of a linearly moving member that linearly moves inside a cylinder tube, including: a stroke position sensor which detects a stroke position of the linearly moving member; a magnet which is disposed on the linearly moving member; a magnetic force sensor which is disposed outside the cylinder tube; a stroke end abutment detecting system which detects an abutment of the linearly moving member to a stroke end; an arithmetic processing portion which performs a correction process to reset an original position of the stroke position by using a detection value of the magnetic force sensor according to a movement of the linearly moving member while the linearly moving member is not abutted to the stroke end, and does not perform the correction process at least about a first correction process after the abutment when the linearly moving member has been abutted to the stroke end.

According to the aspect of the present invention, there is provided the cylinder position measuring device, wherein the stroke end abutment detecting system is a relief valve operation detecting sensor.

According to the aspect of the present invention, there is provided the cylinder position measuring device, including: a pressure correction table indicating a relation between a magnetic force at a certain position detected by the magnetic force sensor and a pressure correction amount which is a deviation amount from a peak position of a wave pattern detected by the magnetic force sensor; and a velocity correction table indicating a relation between a movement velocity of the linearly moving member and a velocity correction amount which is a deviation amount from a peak position of a wave pattern detected by the magnetic force sensor; wherein the arithmetic processing portion detects a magnetic force at the certain position, calculates the pressure correction amount at the peak position of a wave pattern detected by the magnetic force sensor based on the pressure correction table, calculates a moving velocity of the linearly moving member based on a change in the stroke position, further calculates the velocity correction amount at the peak position of a wave pattern detected by the magnetic force sensor based on the velocity correction table, calculates a corrected stroke position corrected by adding the pressure correction amount as well as the velocity correction amount to the stroke position indicating the peak position of a wave pattern detected by the magnetic force sensor, and resets an original position of the stroke position based on the corrected stroke position.

According to the aspect of the present invention, there is provide the cylinder position measuring device, wherein the arithmetic processing portion resets the original position by the stroke position at a time of a stroke end abutment, in a case where the stroke end abutment detecting system detects that the linearly moving member is abutted to the stroke end.

According to another aspect of the present invention, there is provided a cylinder position measuring method which measures a position of a linearly moving member by correcting an original position of the linearly moving member that linearly moves inside a cylinder tube by using a magnetic force sensor which is disposed outside the cylinder tube, including: a judging step of judging whether the linearly moving member is abutted to a stroke end or not; a process step of performing a correction process that resets the original position of the linearly moving member by using a detection value of the magnetic force sensor according to a movement of the linearly moving member when the linearly moving member is judged not to be abutted to the stroke end, and does not to perform the correction process at least about a first correction process after an abutment when the linearly moving member is judged to be abutted to the stroke end.

According to the aspect of the present invention, there is provided the cylinder position measuring method, further including a stroke end reset processing step that resets the original position by a stroke position at a time of a stroke end abutment, in a case where the linearly moving member is abutted to the stroke end.

Advantageous Effects of Invention

According to the present invention, the arithmetic processing portion is configured to perform the correction process that resets the original position of the stroke position by using the detection value of the magnetic force sensor according to the movement of the linearly moving member while the linearly moving member is not abutted to the stroke end, and not to perform the correction process, when the linearly moving member is abutted to the stroke end, at least about the first correction process after the abutment. These enable to measure the stroke position of the cylinder with a high degree of accuracy by appropriately coping with a situation of a high hydraulic pressure applied inside the cylinder.

BRIEF DESCRIPTION OF DRAWINGS

FIG. 3-1 is an enlarged vertical cross-sectional view of a cylinder tube 250 shown in FIG. 1.

FIG. 3-2 is an A arrow view of FIG. 3-1.

FIG. 3-3 is a Z arrow view of FIG. 3-1.

FIG. 3-4 is a diagram that defines respective surface of a first magnetic force sensor and a second magnetic force sensor.

FIG. 4-1 is a diagram illustrating a status of a line of magnetic force when a magnet is placed close to the second magnetic force sensor.

FIG. 4-2 is a diagram illustrating a status of a line of magnetic force when a magnet is placed in the middle position between the first magnetic force sensor and the second magnetic force sensor.

FIG. 4-3 is a diagram illustrating a status of a line of magnetic force when a magnet is placed close to the first magnetic force sensor.

DESCRIPTION OF EMBODIMENTS

With reference to the accompanying drawings, an embodiment of the present invention is described below.

(Structure of Cylinder)

Figure 1:
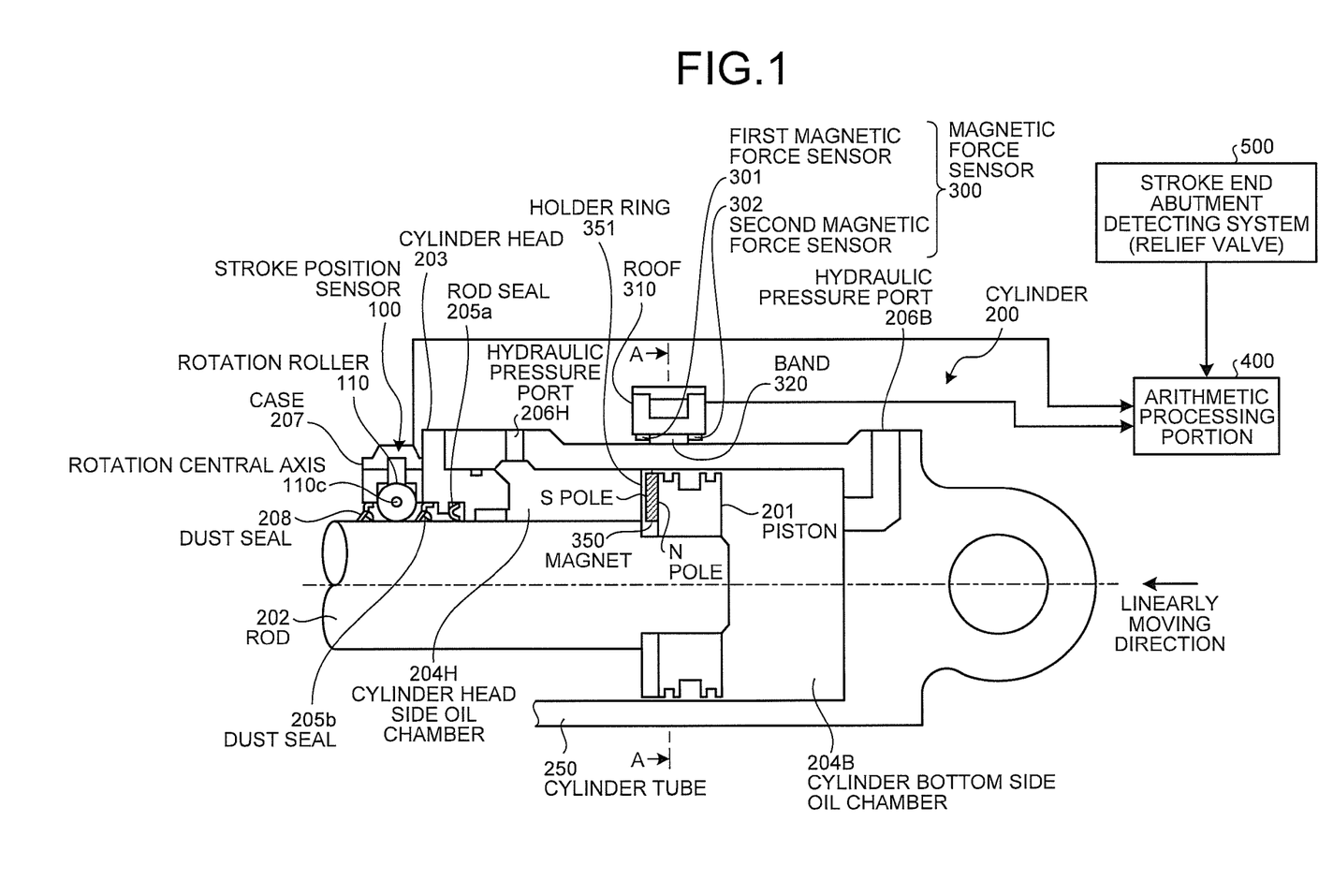
FIG. 1 is a vertical cross-sectional view illustrating a constitution of a cylinder in an embodiment of the present invention.

FIG. 1 is a vertical cross-sectional view illustrating a constitution of a cylinder in this embodiment of the present invention. A piston 201 is slidably disposed in a cylinder tube 250 that is a wall of a cylinder 200 as illustrated in FIG. 1. A rod 202 is attached to the piston 201. The rod 202 is slidably disposed on a cylinder head 203. A cylinder head side oil chamber 204H is constituted with a chamber defined by the cylinder head 203 and the piston 201 and an inner wall of the cylinder 200. A cylinder bottom side oil chamber 204B is constituted with an oil chamber situated on the opposite side of the cylinder head side oil chamber 204H over the piston 201.

The cylinder head 203 is provided with a rod seal 205a and a dust seal 205b that seals a gap with respect to the rod 202 so as to prevent contaminations, such as dust or the like, from entering the cylinder head side oil chamber 204H.

Inside the cylinder tube 250, hydraulic pressure ports 206H and 206B are formed. Through the hydraulic pressure ports 206H, pressure oil is supplied to the cylinder head side oil chamber 204H, and through the cylinder head side oil chamber 204H, the pressure oil is discharged. Alternatively, through the hydraulic pressure ports 206B, pressure oil is supplied to the cylinder bottom side oil chamber 204B, and the pressure oil is discharged through the hydraulic pressure ports 206B from the cylinder bottom side oil chamber 204B.

By supplying the pressure oil to the cylinder head side oil chamber 204H, and discharging the same from the cylinder bottom side oil chamber 204B, the rod 202 is retracted, and alternatively, by discharging the pressure oil from the cylinder head side oil chamber 204H, and supplying the same to the cylinder bottom side oil chamber 204B, the rod 202 is extended. This makes the rod 202 linearly move in the left and right directions on the sheet of FIG. 1.

A case 207, which covers a stroke position sensor 100 and contains the same inside, is formed on the outside of the cylinder head side oil chamber 204H and positioned closely to the cylinder head 203. The case 207 is fastened by a bolt or the like to the cylinder head 203 so as to be fixed on the cylinder head 203. Namely, the case 207 (stroke position sensor 100) can be attached or detached easily on the cylinder tube 250.

A rotation roller 110 constituting the stroke position sensor 100 is disposed such that its surface makes contact with the surface of the rod 202 so as to be able to rotate according to the linear motion of the rod 202. Namely, the straight line movement of the rod 202 is converted into the rotation movement by the rotation roller 110.

The rotation roller 110 is placed in such a way that its rotation central axis 110c is positioned orthogonally to a linearly moving direction of the rod 202. The case 207 is provided with a dust seal 208 that seals a gap with respect to the rod 202 so as to prevent contamination, such as a dust or the like, from entering a gap between the rotation roller 110 and the rod 202. This prevents the situation where dust or the like enters the gap between the rotation roller 110 and the rod 202 so as to bring the rotation roller 110 into malfunction. Namely, a dustproof structure of the stroke position sensor 100 is formed by the dust seal 208 disposed on the case 207 and the dust seal 205b disposed on the cylinder head 203.

The stroke position sensor 100 has the rotation roller 110 and the rotation sensor portion (not shown) that detects the rotation amount of the rotation roller 110. The signal indicating the rotation amount detected by this rotation sensor portion of the rotation roller 110 is sent to an arithmetic processing portion 400, and further converted into the stroke position of the rod 202 of the cylinder 200.

A slip caused between the rotation roller 110 of the stroke position sensor 100 and the rod 202 is not avoidable, and this slip causes an error (refer to an accumulated errors cause by slip) between the measured position of the rod 202 obtained by the result of detection by the stroke position sensor 100 and the actual position of the rod 202. In order to reset the measured position obtained by the detection result by the stroke position sensor 100 into the original position (reference position), a magnetic force sensor 300 is disposed outside the cylinder tube 250 as a reset sensor.

The piston 201 is provided with a magnet 350 which generates a line of magnetic force. The magnet 350 is disposed on the piston 201 such that the S pole and the N pole of the magnet are placed along the linearly moving direction of the piston 201 and the rod 202. Note that, the magnet 350 can be disposed on the piston 201 such that the S pole and the N pole of the magnet are placed perpendicular to the linearly moving direction of the piston 201 and the rod 202.

The magnetic force sensor 300 consists of two magnetic force sensors (a first magnetic force sensor 301 and a second magnetic force sensor 302) which are spaced apart from each other by a predetermined distance therebetween along the linearly moving direction of the piston 201. The first magnetic force sensor 301 and the second magnetic force sensor 302 transmits the line of magnetic force which is generated by the magnet 350 so as to detect the magnetic force (refer to a magnetic flux density), and output the electrical signal (voltage) according to the magnetic force. The first magnetic force sensor 301 and the second magnetic force sensor 302 are disposed at the known original positions. Based on the detection results by the first magnetic force sensor 301 and the second magnetic force sensor 302, the measured position obtained by the detection result by the stroke position sensor 100 is reset to the original position (reference position).

Note that, based on the detection positions of the first magnetic force sensor 301 and the second magnetic force sensor 302, the absolute movement distance of the piston 201 and the rod 202 can be measured. For example, when the rotation roller 110 of the stroke position sensor 100 is worn due to aging, the moving distance of the rod 202 obtained by the detected rotation amount by the stroke position sensor 100 becomes shorter than the actual moving distance of the rod 202. However, based on the ratio of L/L' wherein L' is defined by a moving distance L' obtained by the detected rotation amount of the stroke position sensor 100 when the piston 201 moved between the first magnetic force sensor 301 and the second magnetic force sensor 302, and L is defined by an actual distance L of the two magnetic force sensors; namely the first magnetic force sensor 301 and the second magnetic force sensor 302, the moving distance obtained from the detected rotation amount by the stroke position sensor 100 can be corrected.

Moreover, as the first magnetic force sensor 301 and/or the second magnetic force sensor 302, for example, a Hall IC can be used.

The first magnetic force sensor 301 and the second magnetic force sensor 302 are mounted on a roof 310. The roof 310 is mounted on a band 320. The band 320 is fixed on the outer circumference of the cylinder tube 250. The band 320 is constituted with the magnetic material. As a material of the band 320, magnetic materials including steel materials for a general construction or the like, which can be easily obtained, can be used.

Figure 2:
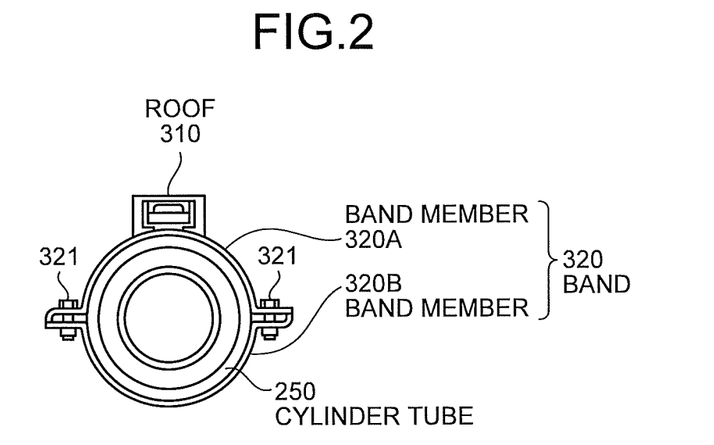
FIG. 2 is an A-A line cross-sectional view of FIG. 1.

FIG. 2 is an A-A line cross-sectional view of FIG. 1 which illustrates a transverse section of the cylinder tube 250. The band 320 is pressed on the outer circumference of the cylinder tube 250 and fixed thereon. The band 320 consists of band members 320A and 320B having semi-circular shaped sections corresponding to the outer diameter of the cylinder tube 250. The band member 320A and the band member 320B are fastened by a bolt 321, and are pressed by this fastening on the outer circumference of the cylinder tube 250. One of the band members 320A is provided with a roof 310. This enables to fix the first magnetic force sensor 301 and the second magnetic force sensor 302 on the outer circumference of the cylinder tube 250 without forming a screw hole in the cylinder tube 250 or performing any processing or treatment, such as welding of the outer circumference of the cylinder tube 250 or the like. Moreover, since any processing or treatment on the cylinder tube 250 is not necessary, the thickness of the cylinder tube 250 can be kept to the minimum thickness.

In addition, a fixed position of the band 320 on the cylinder tube 250 can be easily changed, and the first magnetic force sensor 301 and the second magnetic force sensor 302 can be easily and simply mounted on the cylinder tube 250 at an arbitrary position of the cylinder tube 250 in the longitudinal direction (the linearly moving direction of the piston 201 and the rod 202).

Note that, a rotation amount ω from the stroke position sensor 100, voltage values V1, V2 that show the magnetic forces detected by the first magnetic force sensor 301 and the second magnetic force sensor 302, and a signal SE, which shows whether the piston 201 is abutted to the stroke end, or not, from a stroke end abutment detecting system 500, are input into an arithmetic processing portion 400. Specifically, this stroke end abutment detecting system 500 is a sensor that detects whether a relief valve of a hydraulic pressure pump (not shown) operates or not. In a case where this relief valve operates, the piston 201 is abutted to the stroke end. Moreover, this stroke end abutment detecting system 500 may detect an abutment of the piston 201 to the stroke end under all of the following conditions wherein the piston 201 moves in the direction of the stroke end, the stroke position sensor 100 stops rotation for a certain time or more, as well as the stroke position stays adjacent to the stroke end.

(Magnetic Flux Concentration Structure)

FIG. 3-1 to FIG. 3-4 are diagrams which illustrate structures of the first magnetic force sensor 301, the second magnetic force sensor 302 and the roof 310. FIG. 3-1 is an enlarged vertical cross-sectional view of the cylinder tube 250 illustrated in FIG. 1. FIG. 3-2 is an A arrow view of FIG. 3-1. FIG. 3-3 is a Z arrow view of FIG. 3-1. Moreover, FIG.

Figure 34:
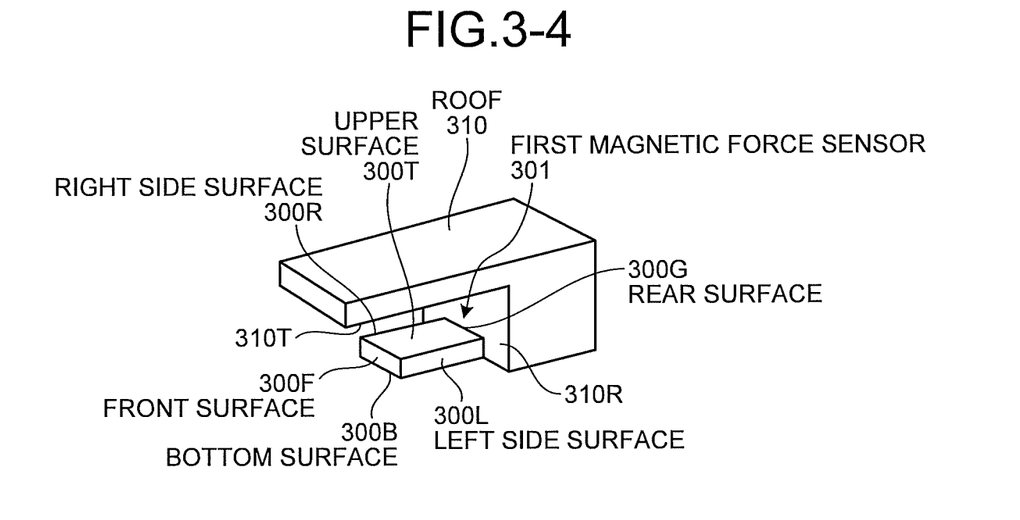

3-4 is a diagram which defines the respective surfaces of the first magnetic force sensor 301 and the second magnetic force sensor 302.

Figure 31:
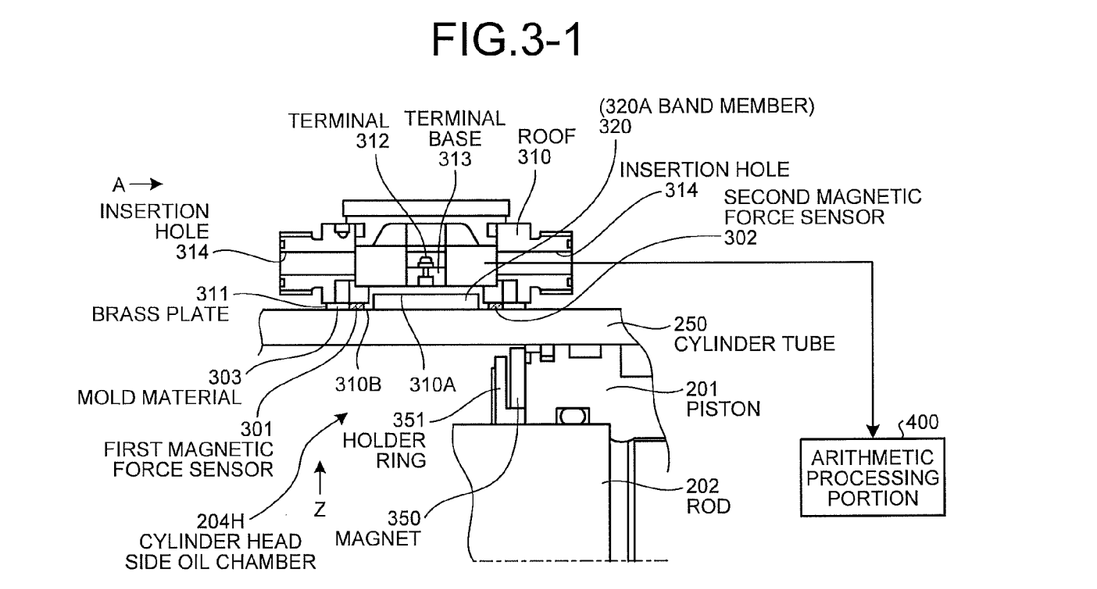
Figure 32:
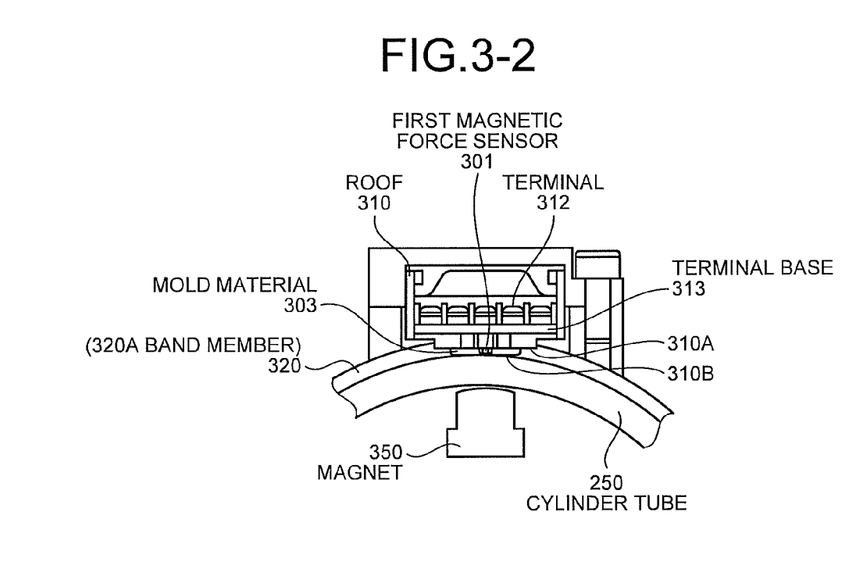
Figure 33:
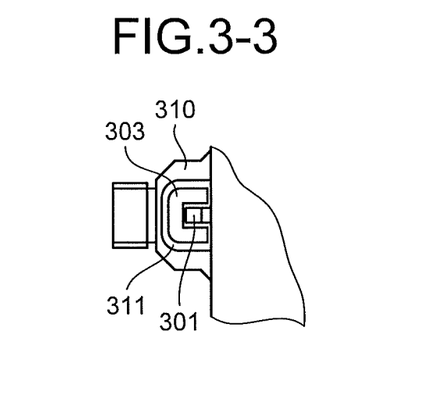

The first magnetic force sensor 301 and the second magnetic force sensor 302 are rectangular parallelepiped shaped members having a bottom surface 300B, a upper surface 300T, a front surface 300F, a left side surface 300L, a right side surface 300R, and a rear surface 300G. On the other hand, the magnet 350 is fixed by a holder ring 351 on a surface of the piston 201 which faces the cylinder head side oil chamber 204H.

The magnet 350 is fixed on the piston 201 by jointly fastening the holder ring 351 and the magnet 350 on the piston 201.

The roof 310 is constituted with the magnetic material, and disposed so as to cover the upper surface 300T and the rear surface 300G of the first magnetic force sensor 301 and the second magnetic force sensor 302. As a material of the roof 310, the magnetic material, such as a carbon steel, other steel materials for a general construction or the like, that can be easily obtained, can be used.

As the placements of the roof 310, the first magnetic force sensor 301 and the second magnetic force sensor 302 are bilaterally symmetric as illustrated in FIG. 3-1, with reference to one of the magnetic force sensors, namely the first magnetic force sensor 301, explanation is made below.

A band fixed surface 310A of the roof 310 is fixed on the band member 320A. A tube adhesive surface 310B of the roof 310 is adhered to the outer circumferential surface of the cylinder tube 250.

The first magnetic force sensor 301 is formed integrally with a mold material 303 so as to be surrounded by the mold material 303. The mold material 303 including the first magnetic force sensor 301 is fixed in such a way that the sides of upper surface 300T and the rear surface 300G of the first magnetic force sensor 301 are fixed on an upper surface fixed surface 310T and a rear surface fixed surface 310R of the roof 310, respectively. Additionally, a bottom surface 300B side of the first magnetic force sensor 301 is adhered to the outer circumferential surface of the cylinder tube 250. On the front surface 300F, and the left and right side surfaces 300L and 300R of the first magnetic force sensor 301, a brass plate 311 is disposed.

Namely, by placing the bottom surfaces 300B of the first magnetic force sensor 301 and the second magnetic force sensor 302 on the outer circumferential surface of the cylinder tube 250, and covering the first magnetic force sensor 301 and the second magnetic force sensor 302 with the roof 310, the magnetic material (roof 310) is placed with respect to the upper surface 300T side and the rear surface 300G side of the first magnetic force sensor 301 and the second magnetic force sensor 302. On the other hand, the magnetic material is not placed with respect to the front surface 300F side and the left and right side surfaces 300L and 300R side of the first magnetic force sensor 301 and the second magnetic force sensor 302 so as to create a magnetic material free structure.

In the roof 310, a terminal base 313 provided with a terminal 312 is built in. Additionally, an insertion hole 314, which a harness (not shown) is inserted into, and is communicated with the terminal 312, is formed in the roof 310. The first magnetic force sensor 301 and the second magnetic force sensor 302, and the terminals 312, are connected through electronic signal lines (not shown). The harness is connected to the terminal 312 through the insertion hole 314 from the outside the roof 310. This harness is connected to an arithmetic processing portion 400.

By having the roof 310, the line of magnetic force generates a path having a starting point at the N pole of the magnet 350 which is transmitted via the cylinder tube 250, the first magnetic force sensor 301 or the second magnetic force sensor 302, and the roof 310, and is returned to the S pole of the magnet 350 through the first magnetic force sensor 301 or the second magnetic force sensor 302.

On the other hand, as the band 320 is constituted with the magnetic material, it becomes a path of the line of magnetic force in the outer circumference direction of the cylinder tube 250, and the line of magnetic force is transmitted through the band 320, and is collected intensively to the first magnetic force sensor 301 and the second magnetic force sensor 302 that are disposed at a single point in the outer circumferential direction of the cylinder tube 250.

Namely, a magnetic flux concentration structure is formed by the roof 310 and the band 320 wherein the magnetic force generated by the magnet 350 is collected intensively to the first magnetic force sensor 301 and the second magnetic force sensor 302, and this enables to reliably detect the magnetic force. As a result, the position measuring accuracy of the rod 202 based on the detection results of the first magnetic force sensor 301 and the second magnetic force sensor 302 can be enhanced.

(Output Wave Patterns of First Magnetic Force Sensor 301 and Second Magnetic Force Sensor 302)

Figure 41:
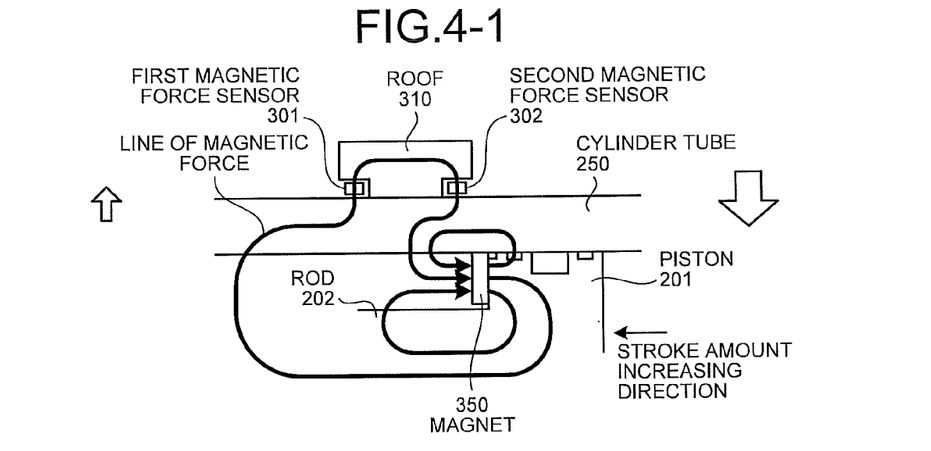
Figure 42:
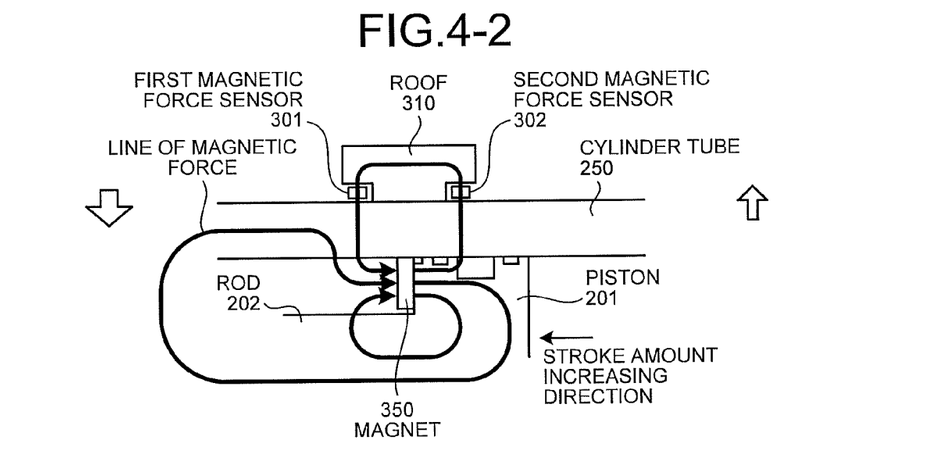
Figure 43:
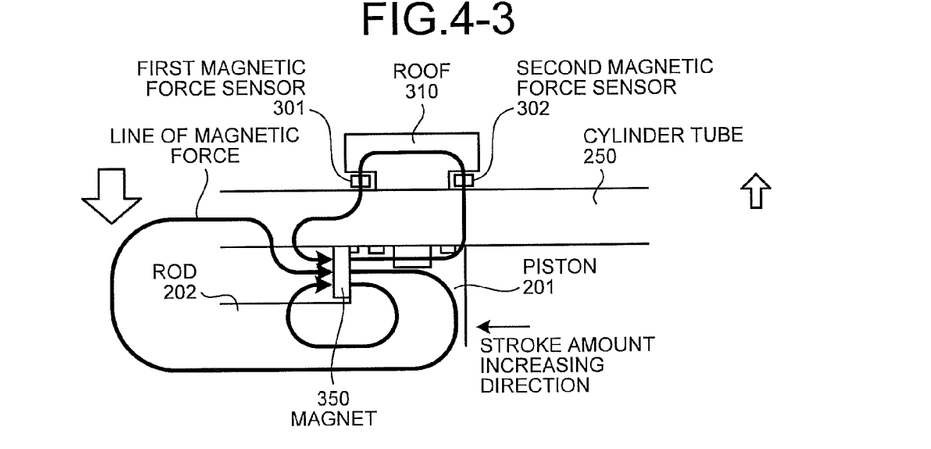

FIG. 4-1 to FIG. 4-3 are diagrams which illustrate the statuses of the line of magnetic force when the magnet 350 attached to the piston 201 passes below the first magnetic force sensor 301 and the second magnetic force sensor 302. As illustrated in FIG. 4-1, when the magnet 350 approaches the second magnetic force sensor 302, the line of magnetic force passes through the first magnetic force sensor 301, the roof 310, and the second magnetic force sensor 302 in this order.

After that, as illustrated in FIG. 4-2, when the magnet 350 arrives at the middle position between the first magnetic force sensor 301 and the second magnetic force sensor 302, the line of magnetic force passes through the second magnetic force sensor 302, the roof 310 and the first magnetic force sensor 301 in this order. Namely, compared to the situation illustrated in the FIG. 4-1, the direction of the line of magnetic force transmitted through the first magnetic force sensor 301 and the second magnetic force sensor 302 is reversed.

Moreover, as illustrated in FIG. 4-3, when the magnet 350 approaches the first magnetic force sensor 301, the line of magnetic force passes in the same way as FIG. 4-2 thorough the second magnetic force sensor 302, the roof 310 and the first magnetic force sensor 301 in this order.

In FIG. 4-1 to FIG. 4-3, arrows on the right side show a size of the magnetic force detected by the second magnetic force sensor 302, and arrows on the left side show the size and the direction of the magnetic force detected by the first magnetic force sensor 301.

Figure 5:
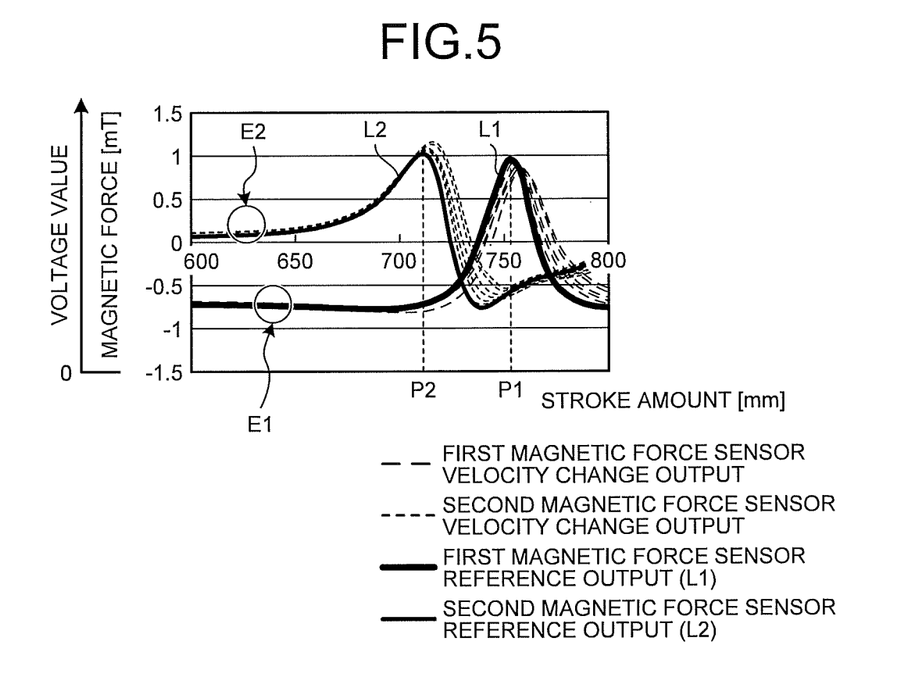
FIG. 5 is a diagram illustrating dependency of the stroke amount of the detection output of the first magnetic force sensor and the second magnetic force sensor as well as a wave pattern change associated with a velocity change.

With reference to FIG. 5, a wave pattern detected by the first magnetic force sensor 301 or the second magnetic force sensor 302 when a stroke position (stroke amount) changes and the magnet 350 moves is more specifically described below.

A stroke amount dependency of the output detected by the second magnetic force sensor 302 is like a characteristic curve L2 as illustrated in FIG. 5, and at a stroke position P2 where the magnet 350 is positioned right under the same, it has the maximum peak value, and at a position passing the stroke position P2, it has the minimum peak value which is convex downward. Namely, the second magnetic force sensor 302 has two peak values. On the other hand, a stroke amount dependency of the output detected by the first magnetic force sensor 301 is like a characteristic curve L1, and at a stroke position P1 where the magnet 350 is positioned right under the same, it has the maximum peak value. The first magnetic force sensor 301 has one output peak value.

The difference of the output wave patterns detected by the first magnetic force sensor 301 and the second magnetic force sensor 302 is caused by an asymmetric structure of the piston 201 and the rod 202 with respect to the linearly moving direction, with respect to the position of the magnet 350.

Here, FIG. 5 illustrates the deviation of the detection output wave pattern caused by the moving velocity of the piston 201, and for respective peak values of the first magnetic force sensor 301 and the second magnetic force sensor 302, a deviation, which generates a time lag of detection position of the peak values, is caused as the moving velocity of the piston increases.

Figure 6:
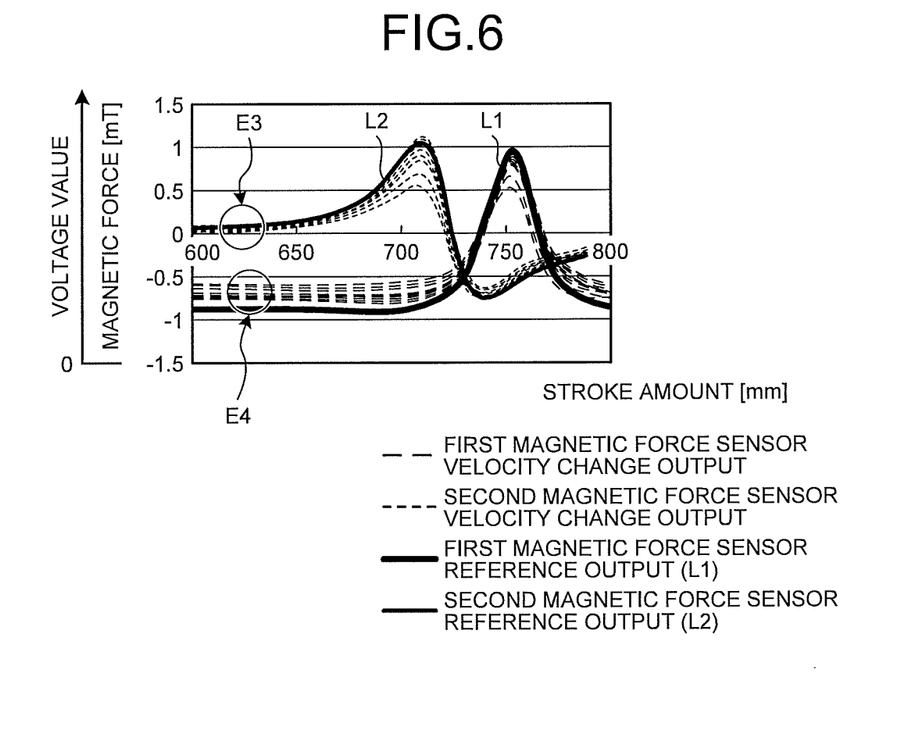
FIG. 6 is a diagram illustrating dependency of the stroke amount of the detection output of the first magnetic force sensor and the second magnetic force sensor as well as a wave pattern change associated with a pressure change.

On the other hand, FIG. 6 illustrates the deviation of the detection output wave pattern caused by pressurization, and for respective peak values of the first magnetic force sensor 301 and the second magnetic force sensor 302, a deviation is caused as the pressure increases.

Figure 7:
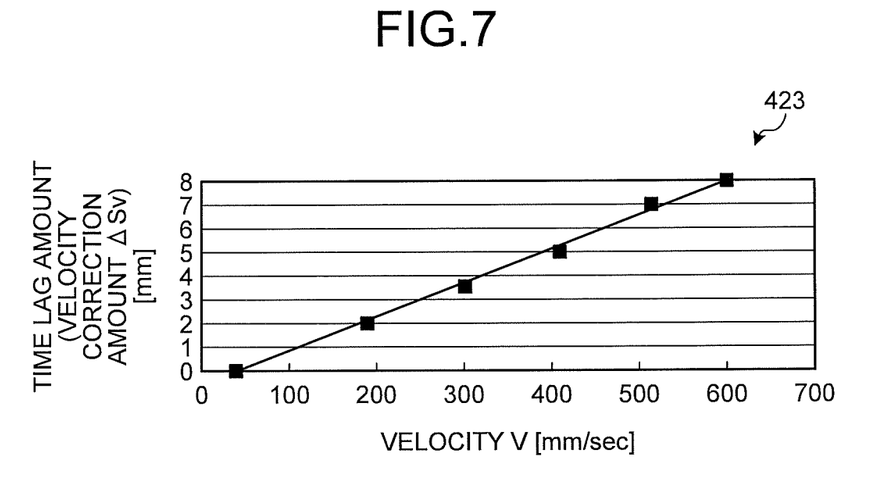
FIG. 7 is a diagram illustrating a content of a velocity correction table.

As illustrated in FIG. 7, a deviation amount of the peak position of the second magnetic force sensor 302 caused by a velocity V of the piston 201 (velocity correction amount $\Delta Sv$) has a corresponding relation where the velocity correction amount $\Delta Sv$ increases as the velocity V increases. This corresponding relation is preliminary installed in the arithmetic processing portion 400 as a velocity correction table 423.

Here, in an area E1 of the first magnetic force sensor 301, an area E2 of the second magnetic force sensor 302 illustrated in FIG. 5, and an area E3 of the second magnetic force sensor 302 illustrated in FIG. 6, even if the velocity V or the pressure changes, there is no remarkable change in a detection output. On the other hand, in an area E4 of the first magnetic force sensor 301 illustrated in FIG. 6, when the pressure changes, there is a remarkable change in the detection output.

Figure 8:
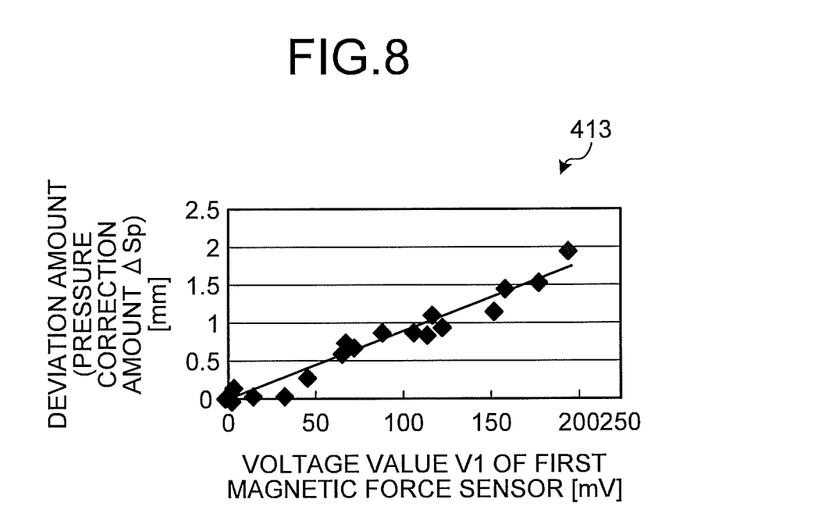
FIG. 8 is a diagram illustrating a content of a pressure correction table.

Then, by calculating the relation between the change in the detection output in the area E4 of the first magnetic force sensor 301 and the deviation amount of the peak position of the second magnetic force sensor 302 (pressure correction amount $\Delta Sp$), it was found that the relation had a corresponding relation as illustrated in FIG. 8. Namely, the corresponding relation, in which as the detection output in the area E4 of the first magnetic force sensor 301 increases, the pressure correction amount $\Delta Sp$ increases, could be obtained. An increased change in the detection output in area E4 corresponds to an increased change in the pressure, and therefore, as a result, the corresponding relation illustrated in FIG. 8 shows the change in deviation amount of the peak position of the second magnetic force sensor 302 corresponding to the change in pressure. This corresponding relation is preliminary installed in an arithmetic processing portion 400 as a pressure correction table 413.

Namely, in this embodiment, the first magnetic force sensor 301 is used as a magnetization status history sensor of the cylinder tube 250 in order to correct the peak value of the second magnetic force sensor 302. Moreover, when doing a reset process of the stroke position by using the peak value of the first magnetic force sensor 301, the stroke position is corrected by using the velocity correction table 423 as well as the pressure correction table 413, and the reset process is performed by this corrected stroke position.

(Change in Magnetization Status of Cylinder Tube when Pressurized)

Figure 9:
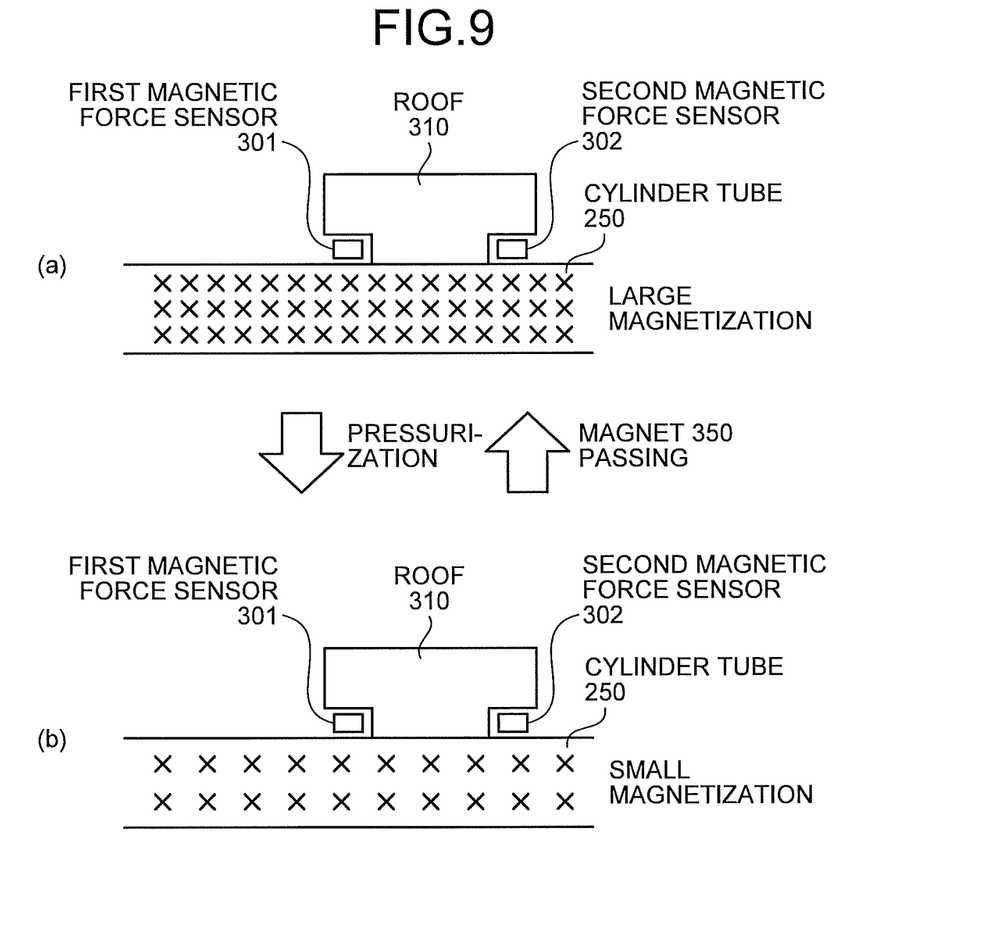
FIG. 9 is an explanatory diagram illustrating a magnetization status of a cylinder tube by pressurization.

Here, a magnetization status before pressurization to the cylinder 200 is illustrated in FIG. 9(*a*), and by pressurization, the magnetization status changes to become smaller as illustrated in FIG. 9(*b*). In other words, the distortion of the cylinder tube 250 is caused by the pressurization, and the surface magnetic force of the cylinder tube 250 changes. Especially, when the piston 201 is abutted to the stroke end, a large pressure is applied inside the cylinder tube 250, and the surface magnetic force of the cylinder tube 250 changes significantly. This significant change of the surface magnetic force causes the significant deviation amount on the reset detection position. For this reason, in this embodiment, when the piston 201 is abutted to the stroke end, as the surface magnetic force of the cylinder tube 250 is significantly changed right after the abutment, the reset process by the reset sensors (the first magnetic force sensor 301 and the second magnetic force sensor 302) is not performed in this situation.

Note that, as illustrated in FIG. 9(*b*) even though the magnetization is decreased temporarily, for example, afterward, when the magnet 350 disposed on the piston 201 passes inside the cylinder tube 250, the magnetization of the cylinder tube 250 is restored to its original intensity.

(Constitution of Arithmetic Processing Portion and Reset Process)

Figure 10:
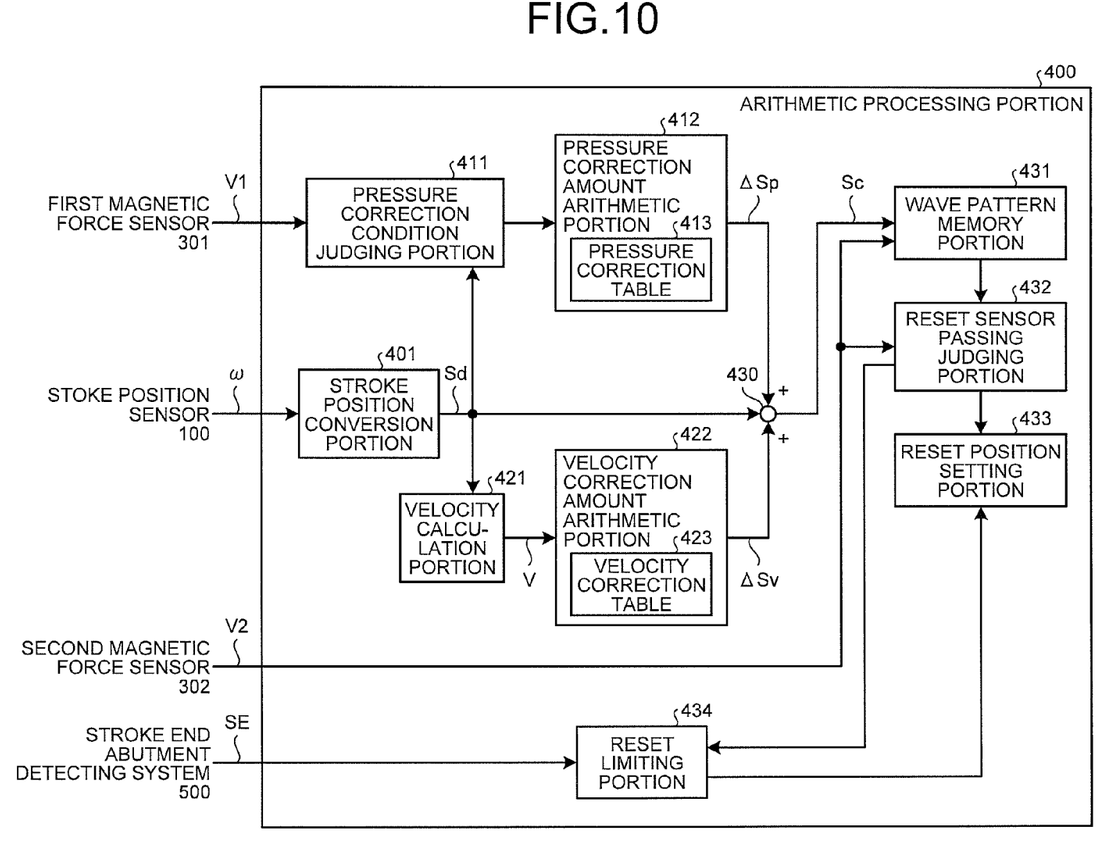
FIG. 10 is a block diagram illustrating a constitution of an arithmetic processing portion.
Figure 11:
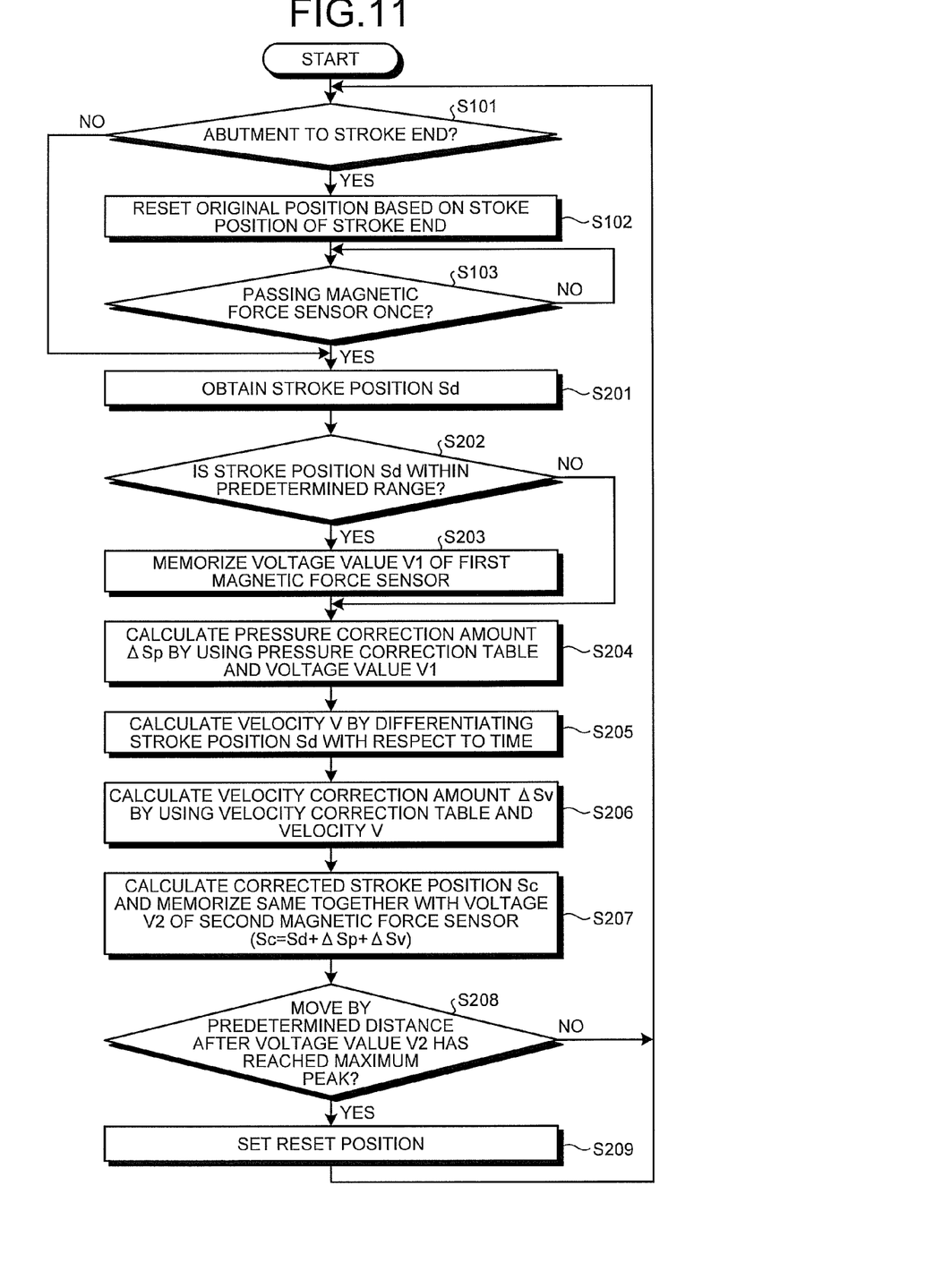
FIG. 11 is a flow chart illustrating a reset processing procedure by the arithmetic processing portion.

FIG. 10 is a block diagram which illustrates a constitution of the arithmetic processing portion 400. Moreover, FIG. 11 is a flow chart which illustrates a reset process procedure by the arithmetic processing portion 400. With reference to FIG. 10 and FIG. 11, the reset process of the stroke position by using the detection result of the first magnetic force sensor 301, the second magnetic force sensor 302, the stroke position sensor 100, and the stroke end abutment detecting system 500 is described below.

First of all, a reset limiting portion 434 judges whether the piston 201 is abutted to the stroke end or not based on the signal SE from the stroke end abutment detecting system 500 (step S101). In a case where the piston 201 is abutted to the stroke end (step S101, Yes), the reset limiting portion 434 resets the original position based on the stroke position as this stoke end with respect to a reset position setting portion 433 (step S102)

Afterward, based on a judgment result by a reset sensor passing judging portion 432, after abutment to the stroke end, it is judged whether the magnet 350 attached to the piston 201 has passed the magnetic force sensor 300 once or not (step S103). In a case where the magnet 350 has not passed the magnetic force sensor 300 once (step S103, No), this judging process of step S103 is repeated, and the reset process is not performed based on the detection result of the magnetic force sensor 300.

Figure 12:
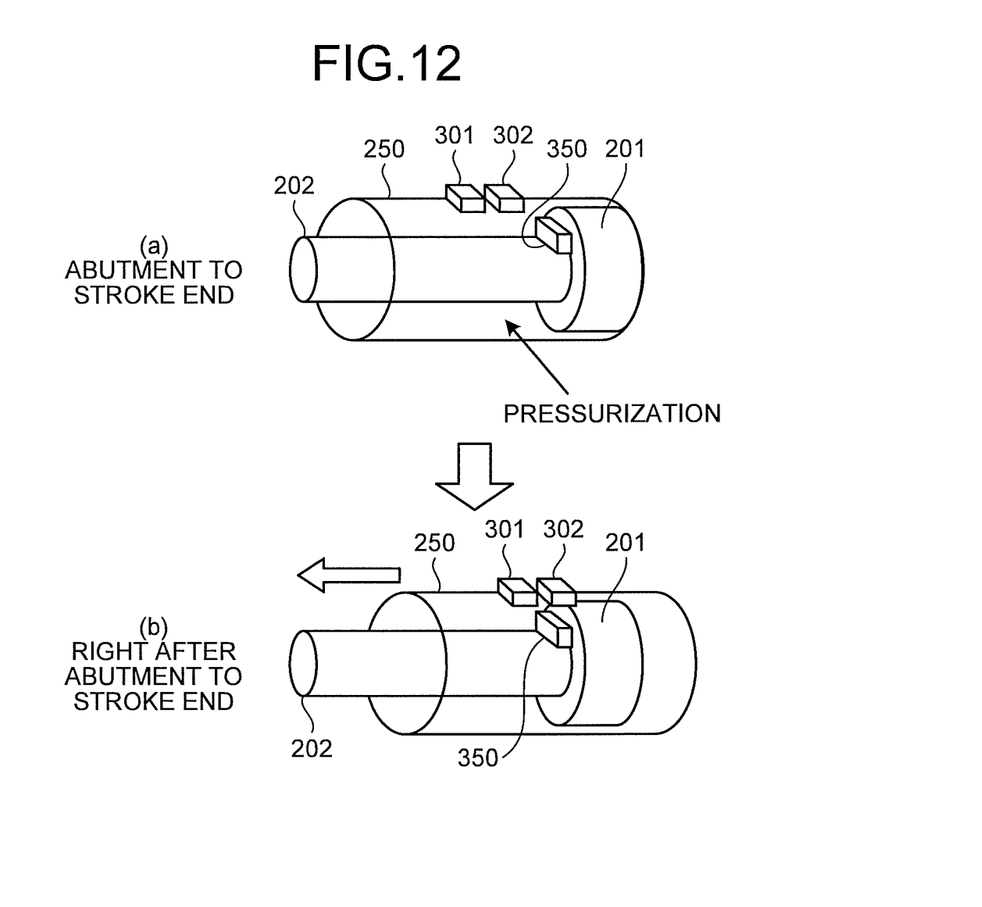
FIG. 12 is a diagram illustrating a status where a lift cylinder of a bulldozer is abutted to a stroke end as well as a status right after the abutment of the same.

For example, FIG. 12 illustrates a schematic constitution of a lift cylinder for blade lift of a bulldozer. In FIG. 12 (*a*), the inside of the cylinder tube 250 is pressurized, and the piston 201 is abutted to the stroke end. Furthermore, as illustrated in FIG. 12 (*b*), right after the abutment of the piston 201 to the stroke end, even if the magnet 350 passes the first magnetic force sensor 301 and the second magnetic force sensor 302, the reset process is not performed by using the first magnetic force sensor 301 and the second magnetic force sensor 302.

Note that, in the step S103, it is judged whether the magnet 350 has passed the magnetic force sensor 300 once or not, however, this passing may be at least one, thus for example, it may be configured to judge whether the magnet 350 has passed the magnetic force sensor 300 twice or more, or not. By setting the condition of the passing twice or more, the magnetization status of the cylinder tube 250 can be more surely restored.

On the other hand, in a case without an abutment to the stroke end (step S101, No), or a case where the magnet 350 has passed the magnetic force sensor 300 once (step S103, Yes), the reset process is performed by using the detection result of the magnetic force sensor 300.

In this reset process, first, a stroke position conversion portion 401 converts a rotation amount ω output by the stroke position sensor 100 into a stroke position Sd which is a linearly moving amount of the rod 202 or the piston 201. Further, by obtaining the stroke position Sd, this stroke position Sd is output into a pressure correction condition judging portion 411, a velocity calculation portion 421, and an addition portion 430 (step S201).

Afterward, the pressure correction condition judging portion 411 judges whether the stroke position Sd is located within a predetermined area where the magnetization status of the cylinder tube 250 can be detected as shown in the area E4 (step S202). Moreover, when the stroke position Sd is located within the predetermined area (step S202, Yes), a pressure correction amount arithmetic portion 412 memorizes the voltage value V1 detected by the first magnetic force sensor 301 (step S203). After memorizing the voltage value V1 or when the stroke position Sd is not located in the predetermined area (step S202, No) the pressure correction amount arithmetic portion 412 calculates the pressure correction amount ΔSp by using the pressure correction table 413 and the voltage value V1, and further, outputs the same into the addition portion 430 (step S204).

Afterward, a velocity calculation portion 421 calculates the velocity V by differentiating the input stroke position Sd with respect to time, and outputs this velocity V into a velocity correction amount arithmetic portion 422 (step S205). Further, the velocity correction amount arithmetic portion 422 calculates the velocity correction amount ΔSv by using the velocity correction table 423 as well as the velocity V, and outputs the same into the addition portion 430 (step S206).

Afterward, the addition portion 430 outputs the corrected stroke position Sc, which is corrected by adding the pressure correction amount ΔSp and the velocity correction amount ΔSv to the stroke position Sd, into a wave pattern memory portion 431. This wave pattern memory portion 431 memorizes the corrected stroke position Sc and the input of voltage value V2 detected by the second magnetic force sensor 302 in such a way that they correspond to each other (step S207). Namely, a history of the voltage value V2 in relation to the corrected stroke position Sc is retained.

Afterward, a reset sensor passing judging portion 432 judges whether a movement of predetermined distance has been performed or not, after the voltage value V2 had reached the maximum peak value (step S208). In other words, it judges whether the magnet 350 has passed the second magnetic force sensor 302 or not.

When the movement of predetermined distance has been performed after the voltage value V2 had reached the maximum peak (step S208, Yes), a reset position setting portion 433 resets the corrected stroke position Sc corresponding to the voltage value V2 at the maximum peak as an actual stroke position (original position correction, step S209), and shifts back to the step S101 and repeats the process described above. On the other hand, when the movement of predetermined distance has not been performed after the voltage value V2 had reached the maximum peak (step S208, No), as the voltage value V2 is not at the maximum peak yet, the reset position setting portion 433 shifts back to the step S101 and repeats the process described above.

Note that, in the process mentioned above, after performing a correction amount arithmetic process based on the pressure in the steps S202 to S204, a correction amount arithmetic process based on the velocity in the step S205 and S206 is performed. However, the process is not limited to this, and after performing the correction amount arithmetic process based on the velocity in the step S205 and S206, the correction amount arithmetic process based on the pressure in the step S202 to S204 may be performed.

Moreover, the reset corrects the original position based on the position of the reset sensor (second magnetic force sensor 302), however, in actual practice, further converts the same into the original position on the cylinder system coordinates.

Furthermore, it is preferred that the reset process by using the magnetic force sensor 300 mentioned above is performed only when a stroke movement of the piston 201 is performed in a single direction. This is because when restoring the piston 201 from the stroke movement of the single direction, the magnetization status of the cylinder tube 250 is eliminated by the movement of the magnet 350, and thus there is less need for the pressure correction.

Additionally, with respect to the original position correction at the time of the reset process by the reset position setting portion 433, for example, memorizing the corrected stroke position of the past 10 times, and the original position correction may be performed by taking the average of the past 10 times of the corrected stroke position.

MODIFIED EXAMPLE

In the embodiment mentioned above, the pressure correction amount ΔSp of the second magnetic force sensor 302 is calculated by using the first magnetic force sensor 301 as a magnetization status history sensor for the reset process. However, for this reset process, it may be performed by only using the first magnetic force sensor 301 instead of using both the first magnetic force sensor 301 and the second magnetic force sensor 302.

Figure 13:
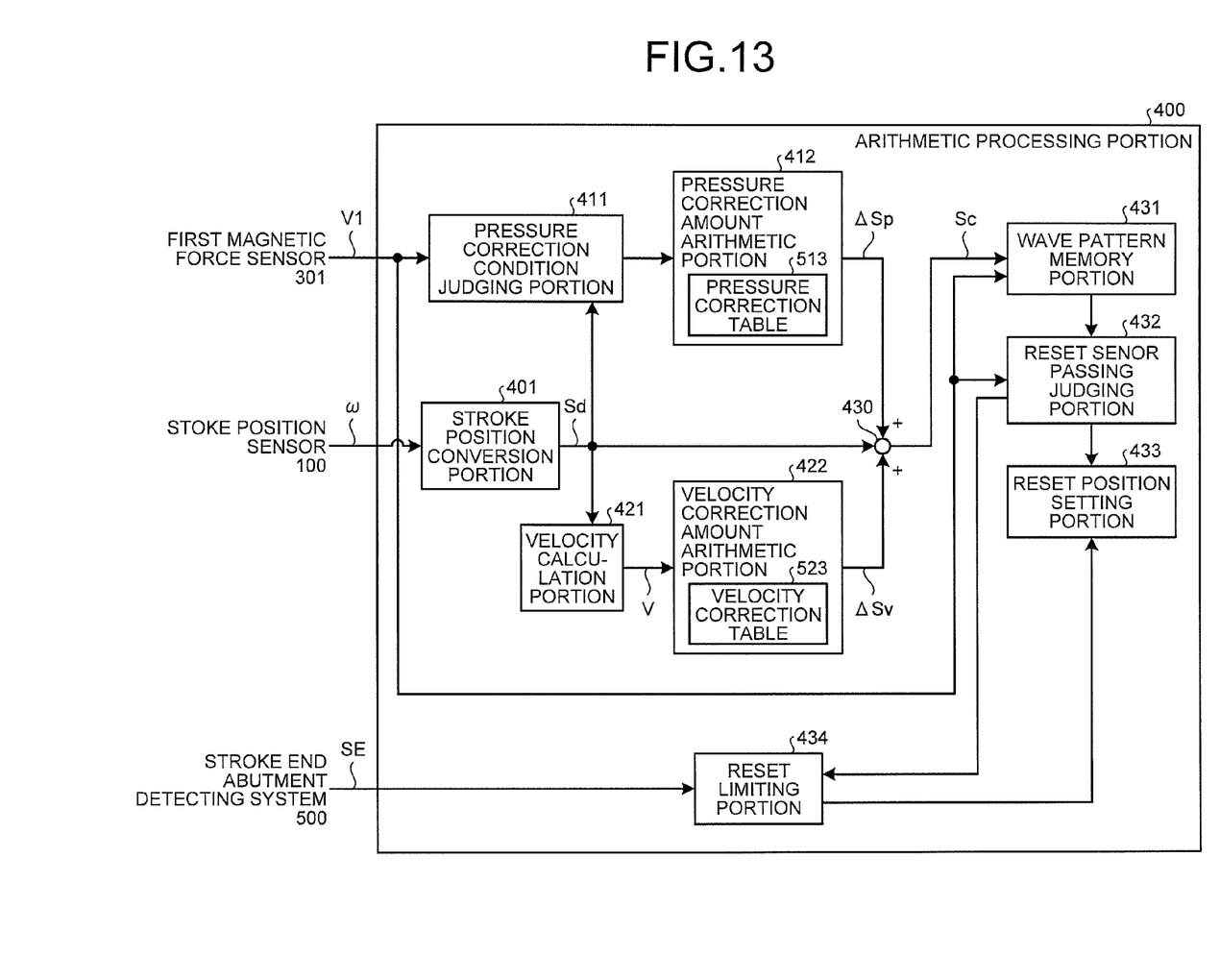
FIG. 13 is a block diagram illustrating a constitution of an arithmetic processing portion in a modified example.

In other words, the reset process is performed by using the first magnetic force sensor 301 as a magnetization status history sensor as well as by the peak value of the first magnetic force sensor 301. Accordingly, as illustrated in FIG. 13, the pressure correction table 413 is replaced with a pressure correction table 513. This pressure correction table 513 defines the pressure correction amount ΔSp as a deviation amount at the peak value of the first magnetic force sensor 301 with respect to the voltage value V1 of the first magnetic force sensor 301. Moreover, it is provided with a velocity correction table 523 instead of a velocity correction table 423. This velocity correction table 523 defines the velocity correction amount ΔSv as a deviation amount of the peak value of the first magnetic force sensor 301 with respect to the velocity V. Furthermore, as the reset process is performed based on the peak value of the first magnetic force sensor 301, the voltage value V1 of the first magnetic force sensor 301 is input into the wave pattern memory portion 431 and the reset sensor passing judging portion 432.

REFERENCE SIGNS LIST 100 stroke position sensor
110 rotation roller
110c rotation central axis
200 cylinder
201 piston
202 rod
203 cylinder head
204H cylinder head side oil chamber
204B cylinder bottom side oil chamber
205a rod seal
205b, 208 dust seal 206H, 206B hydraulic pressure port
207 case
250 cylinder tube
300 magnetic force sensor
301 first magnetic force sensor
302 second magnetic force sensor
303 mold material
310 roof
311 brass plate
312 terminal
313 terminal base
314 insertion hole
320 band
320A, 320B band member
350 magnet
351 holder ring
400 arithmetic processing portion
401 stroke position conversion portion
411 pressure correction condition judging portion
412 pressure correction amount arithmetic portion
413, 513 pressure correction table
421 velocity calculation portion
422 velocity correction amount arithmetic portion
423, 523 velocity correction table
431 wave pattern memory portion
432 reset sensor passing judging portion
433 reset position setting portion
434 reset limiting portion
500 stroke end abutment detecting system
ω rotation amount
Sd stroke position
Sc corrected stroke position
V velocity
V1, V2 voltage value
ΔSp pressure correction amount
ΔSv velocity correction amount

The invention claimed is:

1. A cylinder position measuring device for measuring a position of a linearly moving member that linearly moves inside a cylinder tube, comprising:
a stroke position sensor for detecting a stroke position of the linearly moving member;
a magnet disposed on the linearly moving member;
a magnetic force sensor disposed outside the cylinder tube;
a stroke end abutment detecting system for detecting an abutment of the linearly moving member to a stroke end;
an arithmetic processing portion configured to perform a correction process to reset an original position of the stroke position by using a detection value of the magnetic force sensor according to a movement of the linearly moving member while the linearly moving member is not abutted to the stroke end, and not to perform the correction process at least about a first correction process after the abutment when the linearly moving member has been abutted to the stroke end.

2. The cylinder position measuring device according to claim 1, wherein the stroke end abutment detecting system is a relief valve operation detecting sensor.

3. The cylinder position measuring device according to claim 1, wherein
the magnetic force sensor includes a first magnetic force sensor, disposed outside the cylinder tube, for detecting, as a change in a magnetic force, a magnetization status history of the cylinder tube depending on a change in a pressure inside the cylinder tube, and a second magnetic force sensor disposed outside the cylinder tube and spaced apart from the first magnetic force sensor along a linearly moving direction of the linearly moving member, and the cylinder position measuring device further comprising:
a magnetic force correction table indicating a relation between a magnetic force detected by the first magnetic force sensor and a magnetic force correction amount which is a deviation amount, in relation to the magnetization status history of the cylinder tube, with respect to a peak position of a wave pattern detected by the second magnetic force sensor; and
a velocity correction table indicating a relation between a movement velocity of the linearly moving member and a velocity correction amount which is a deviation amount from a peak position of a wave pattern detected by the second magnetic force sensor;
wherein the arithmetic processing portion is configured to:
(i) detect a magnetic force of the first magnetic force sensor,
(ii) calculate the magnetic force correction amount at the peak position of a wave pattern detected by the second magnetic force sensor based on the magnetic force correction table,
(iii) calculate a moving velocity of the linearly moving member based on a change in the stroke position,
(iv) calculate the velocity correction amount at the peak position of a wave pattern detected by the second magnetic force sensor based on the velocity correction table,
(v) calculate a corrected stroke position corrected by adding the magnetic force correction amount as well as the velocity correction amount to the stroke position indicating the peak position of a wave pattern detected by the second magnetic force sensor, and
(vi) reset an original position of the stroke position based on the corrected stroke position.

4. The cylinder position measuring device according to claim 1, wherein the arithmetic processing portion is configured to reset the original position by the stroke position at a time of a stroke end abutment, in a case where the stroke end abutment detecting system detects that the linearly moving member is abutted to the stroke end.

5. A cylinder position measuring method for measuring a position of a linearly moving member by correcting an original position of the linearly moving member that linearly moves inside a cylinder tube by using a magnetic force sensor which is disposed outside the cylinder tube, comprising:
judging whether the linearly moving member is abutted to a stroke end or not;
performing a correction process for resetting the original position of the linearly moving member by using a detection value of the magnetic force sensor according to a movement of the linearly moving member when the linearly moving member is judged not to be abutted to the stroke end, and not performing the correction process at least about a first correction process after an abutment when the linearly moving member is judged to be abutted to the stroke end.

6. The cylinder position measuring method according to claim 5, further comprising resetting the original position by a stroke position at a time of a stroke end abutment, in a case where the linearly moving member is abutted to the stroke end.

* * * * *